(12) United States Patent
Hashimoto

(10) Patent No.: US 11,203,232 B2
(45) Date of Patent: Dec. 21, 2021

(54) RADIAL TIRE FOR AIRCRAFT

(71) Applicant: BRIDGESTONE CORPORATION, Tokyo (JP)

(72) Inventor: Kenji Hashimoto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 360 days.

(21) Appl. No.: 16/349,764

(22) PCT Filed: May 23, 2017

(86) PCT No.: PCT/JP2017/019245
§ 371 (c)(1),
(2) Date: May 14, 2019

(87) PCT Pub. No.: WO2018/087950
PCT Pub. Date: May 17, 2018

(65) Prior Publication Data
US 2019/0329591 A1   Oct. 31, 2019

(30) Foreign Application Priority Data
Nov. 14, 2016   (JP) .............................. JP2016-221275

(51) Int. Cl.
*B60C 3/04* (2006.01)
*B60C 9/18* (2006.01)
(Continued)

(52) U.S. Cl.
CPC .................. *B60C 3/04* (2013.01); *B60C 9/08* (2013.01); *B60C 9/20* (2013.01); *B60C 9/263* (2013.01);
(Continued)

(58) Field of Classification Search
CPC .................................. B60C 3/04; B60C 9/263
See application file for complete search history.

(56) References Cited

U.S. PATENT DOCUMENTS 4,203,481 A   5/1980  Ranik, Jr.
4,418,735 A  12/1983  Musy
(Continued)

FOREIGN PATENT DOCUMENTS

CN   102076507 A   5/2011
CN   102825979 A  12/2012
(Continued)

OTHER PUBLICATIONS

Machine Translation: JP-2012250672-A.Toko, Hiroyuki, (Year: 2021).*
(Continued)

*Primary Examiner* — Kendra Ly
(74) *Attorney, Agent, or Firm* — Sughrue Mion, PLLC

(57) ABSTRACT

A radial tire for an aircraft, the radial tire having a rim diameter of 20 inches or less includes a pair of bead portions; a pair of sidewall portions extending outward from the bead portions in a substantially radial direction; a tread portion that couples together respective radial outer ends of the sidewall portions; a toroidal carcass layer reinforcing a portion between bead cores embedded in the bead portions; a belt layer and a tread that are sequentially laminated on an outer side of the carcass layer in the radial direction, wherein a value M obtained by dividing a tire external diameter D by a distance L between bead heels of the bead portions is in a range of from 4.1 to 5.4.

10 Claims, 1 Drawing Sheet

(51) Int. Cl.
*B60C 9/20* (2006.01)
*B60C 9/08* (2006.01)
*B60C 11/03* (2006.01)
*B60C 9/26* (2006.01)
B60C 9/22 (2006.01)
B60C 11/00 (2006.01)
B60C 9/28 (2006.01)

(52) U.S. Cl.
CPC .......... *B60C 11/033* (2013.01); *B60C 9/2204* (2013.01); *B60C 11/0083* (2013.01); *B60C 2009/2032* (2013.01); *B60C 2009/283* (2013.01); *B60C 2011/0388* (2013.01); *B60C 2200/02* (2013.01)

(56) References Cited

U.S. PATENT DOCUMENTS

| | | | | |
|---|---|---|---|---|
| 5,125,445 | A | * | 6/1992 | Watanabe ................. B60C 3/04 152/454 |
| 2007/0137748 | A1 | | 6/2007 | Itai |
| 2011/0214788 | A1 | | 9/2011 | Chambriard et al. |
| 2013/0118666 | A1 | | 5/2013 | Ueyoko |
| 2016/0009139 | A1 | | 1/2016 | Sakiyama |

FOREIGN PATENT DOCUMENTS

| | | | |
|---|---|---|---|
| CN | 105142929 | A | 12/2015 |
| DE | 3201985 | A1 | 10/1982 |
| EP | 0267139 | A2 | 5/1988 |
| EP | 0 407 214 | A1 | 1/1991 |
| EP | 1 800 905 | A2 | 6/2007 |
| JP | S63116903 | A | 5/1988 |
| JP | 2-12762 | B2 | 3/1990 |
| JP | 03-99902 | A | 4/1991 |
| JP | 4-358905 | A | 12/1992 |
| JP | 04358905 | A * | 12/1992 |
| JP | 6-48109 | A | 2/1994 |
| JP | 6-53441 | B2 | 7/1994 |
| JP | 2644518 | B2 | 8/1997 |
| JP | 2807489 | B2 | 10/1998 |
| JP | 2000-185510 | A | 7/2000 |
| JP | 2003-205702 | A | 7/2003 |
| JP | 2007-168578 | A | 7/2007 |
| JP | 2012-171478 | A | 9/2012 |
| JP | 2012250672 | A * | 12/2012 |
| LU | 92031 | A2 | 12/2013 |

OTHER PUBLICATIONS

Machine Translation:JP-04358905-A, Tanaka, Makoto, (Year: 2021).*
Communication dated Aug. 12, 2019, from the European Patent Office in counterpart European Application No. 17868919.6.
International Search Report for PCT/JP2017/019245 dated Aug. 15, 2017 [PCT/ISA/210].
Search Report dated Jul. 31, 2020 from the China National Intellectual Property Administration in Application No. 2017800704707.

* cited by examiner

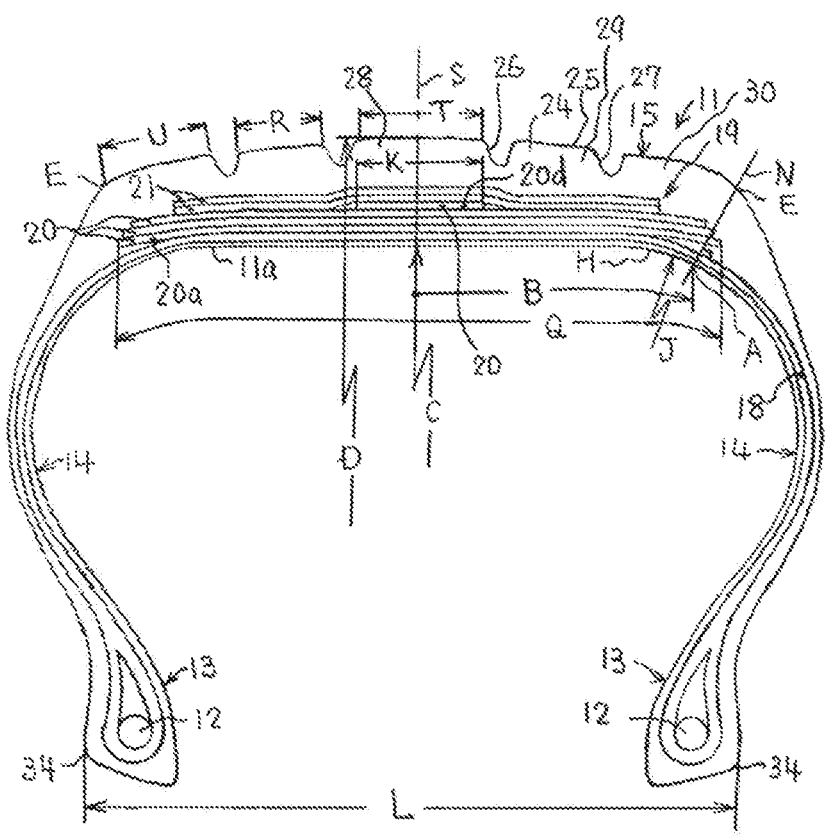

RADIAL TIRE FOR AIRCRAFT

CROSS REFERENCE TO RELATED APPLICATIONS

This application is a National Stage of International Application No. PCT/JP2017/019245 filed May 23, 2017, claiming priority based on Japanese Patent Application No. 2016-221275 filed Nov. 14, 2016 the contents of which are incorporated by reference in this application.

TECHNICAL FIELD

The present disclosure relates to a radial tire for an aircraft having a rim diameter of 20 inches or less in which wear tends to proceed at a middle portion of a tread.

BACKGROUND ART

As a conventional air tire, for example, a tire described in Japanese Patent Application Laid Open (JPA) No. 2012-171478 is known.

In the tire, a first circumferential main groove extending in a tire circumferential direction is formed in a tire equator, and first narrow grooves extending in the tire circumferential direction are formed on respective sides of the first circumferential main groove, so that first rib-shaped land portions are composed between the first circumferential main groove and each of the first narrow grooves. A plurality of inclined grooves, which are inclined with respect to the tire circumferential direction, are formed in the first rib-shaped land portion at established intervals in the tire circumferential direction. The first rib-shaped land portion is thereby partitioned into a plurality of block-shaped land portions. Composing the block-shaped land portions, as the nearest land portion to the tire equator of the tread, reduces rigidity of the land portion and improves trackability on a ground surface, as compared with a case in which a rib extending in the circumferential direction is composed as the land portion. The wear is thereby effectively suppressed at a middle portion of a tread.

SUMMARY OF INVENTION

Problems to be Solved by the Invention

Radial tires for an aircraft having middle or small rim diameters, i.e. rim diameters of 20 inches or less have the problem that wear tends to proceed at a middle portion of a tread of the tire, in other words, the problem of poor resistance to uneven wear at the middle portion of the tread, though radial tires having large rim diameters, i.e. rim diameters of over 20 inches (50.8 cm) do not have such a problem. It is conceivable that this is because, in the radial tire for the aircraft having the middle or small diameter, since a rim flange width relative to a rim external diameter is narrow, as compared with that in the radial tire for the aircraft having the large rim diameter, the crown radius of a tread surface of the tread (the radius of curvature of the tread surface of the tread in a tire meridional cross section) in charging an internal pressure becomes quite small, and as a result, a ground contact area becomes small at the middle portion of the tread. To solve this problem, it is conceivable to apply a tread pattern as described in JPA No. 2012-171478 to the radial tire for the aircraft having the middle or small diameter, in order to suppress the proceeding of wear at the middle portion of the tread. However, when the block-shaped land portions are formed in the tread surface at the middle portion of the tread, an excessive circumferential force and a lateral force are applied to the block-shaped land portions, while the tire travels on a road while being applied with a heavy load, and blocks chip frequently.

An object of the present disclosure is to provide a radial tire for an aircraft that can effectively suppress wear at a middle portion of a tread.

Means for Solving the Problems

Such an object can be achieved by a radial tire for an aircraft, the radial tire having a rim diameter of 20 inches or less and includes a pair of bead portions; a pair of sidewall portions extending outward from the bead portions in a substantially radial direction; a tread portion that couples together respective radial outer ends of the sidewall portions; a toroidal carcass layer reinforcing a portion between bead cores embedded in the bead portions; and a belt layer and a tread that are sequentially laminated on the outer side of the carcass layer in the radial direction, wherein a value M obtained by dividing a tire external diameter D by a distance L between bead heels of the bead portions is in a range of from 4.1 to 5.4.

Effect of the Invention

According to a present disclosure, in a radial tire for an aircraft, the radial tire having a middle or small diameter, i.e. a rim diameter of 20 inches or less, when a value M obtained by dividing a tire external diameter D by a distance L between bead heels is set at 4.1 or more, a tire ground contact width during traveling with a heavy load significantly increases. As a result of this, a ground contact area significantly increases too. Furthermore, when the tire external diameter D is large relative to the distance L between the bead heels, the circumference of the tire becomes long, so the number of revolutions of the tire (the number of ground contacts at a specific position in the circumference), while the tire travels on the same distance, decreases. As a result of this, wear at the middle portion of a tread is effectively suppressed. Conversely in a case where the value M exceeds 5.4, the tire becomes heavy. Manufacturing cost increases, while a rolling resistance decreases, thus becoming impracticable.

BRIEF DESCRIPTION OF THE DRAWINGS

FIG. 1 is a meridional section view of Embodiment 1 of the present disclosure.

DETAILED DESCRIPTION

Embodiment 1 of the present disclosure will be described below with reference to the drawing.

In FIG. 1, the reference numeral 11 indicates a radial tire for an aircraft. The tire 11 has a pair of bead portions 13 in which a pair of bead cores 12 are embedded, respectively. A pair of sidewall portions 14 extends outward from the bead portions 13 substantially in a radial direction. Radial outer ends of the sidewalls 14 are coupled together respective by an substantially cylindrical tread portion 15. The tire 11 has a carcass layer 18 that toroidally extends between the bead cores 12 embedded in the bead portions 13, to reinforce the sidewall portions 14 and the tread portion 15. In the carcass layer 18, a number of steels, organic fibers, and the like, e.g. carcass cords made of nylon extending in the radial direction (meridional direction) are embedded. The carcass layer 18 is composed of a lamination of at least one, e.g. three ply layers here.

A belt layer 19 is overlaid on the outer side of the carcass layer 18 in a radial direction. The main belt layer 19 is constituted of at least three e.g. four main belt layers 20 here, and at least two e.g. two secondary belt layers 21 here, which are overlaid on the main belt layers 20 in the radially outward direction. A number of the secondary belt layers 21 is lower than a number of the main belt layers 20. A width of the secondary belt layers 21 is narrower than a maximum width of the main belt layers 20. A tread 24 is disposed on the outer side of the carcass layer 18 and the belt layer 19 in the radial direction. As a result of this, the belt layer 19 and the tread 24 that are sequentially laminated on an outer side of the carcass layer 18 in the radial direction. A pair of inner side main grooves 26, extending continuously in a circumferential direction, is formed in a tread surface 25, which is an external surface of the tread 24, on respective sides of a tire equator S, and a pair of outer side main grooves 27 extending continuously in the circumferential direction is formed in the tread surface 25 respective outer sides of the inner side main grooves 26 in a width direction. As a result of this, an inner side rib 28 extending in the circumferential direction in the tire equator S is formed between the pair of inner side main grooves 26 in the vicinity of the tire equator S. A pair of middle ribs 29, extending in the circumferential direction, are respectively formed between the inner side main groove 26 and the outer side main groove 27. A pair of outer side ribs 30 is respectively formed between the outer side main groove 27 and a tread ground contact end E. Note that, in the present disclosure, the inner side and outer side main grooves may be bent in a zigzag manner.

The tread ground contact end E refers to an outermost ground contact position of a ground contact region on a road in a tire axial direction (width direction), provided that the tire is attached to a standard rim of an applicable size described in a standard TRA "Aircraft Year Book of the Tire and Rim Association Inc." effective in the U.S. with being filled with a standard internal pressured defined in the standard TRA and being applied with a standard load defined in the standard TRA. In the case of the radial tire for the aircraft having a rim diameter of 20 inches (50.8 cm) or less, as described above, there is a problem that wear tends to proceed at a middle portion of the tread surface 25 of the tread 24 in the width direction, while the aircraft is taxing on a runway. The rim diameter refers to a nominal diameter of the standard rim to which the tire 11 is attached, and is the same as the diameter of a bead heel 34 of the tire 11 (tire internal diameter).

To solve the above problem, in the present embodiment, a value M (D/L) obtained by dividing a tire external diameter D by a distance L between bead heels is set at 4.1 or more. The distance L between the bead heels is an axial distance (referred to as a foot breadth) between the bead heels 34 of the bead portions 13. By setting the value M at 4.1 or more, the tread surface 25 of the tread 24 has a large crown radius, thus causing a significant increase in a tire ground contact width during traveling with a load. As a result of this, a ground contact area significantly increases too. Since the tire external diameter D is large relative to the distance L between the bead heels, the circumference of the tire becomes long. The number of revolutions of the tire 11 (the number of ground contacts at a specific position in the circumference), during traveling on the same distance, decreases. Therefore, as is apparent from the following test results, wear at the middle portion of the tread 24 (tread surface 25) in the width direction is effectively suppressed. Conversely in a case where the value M exceeds 5.4, the tire 11 becomes large and heavy. As a result of this, a manufacturing cost increases, while a rolling resistance decreases, thus becoming impracticable. Therefore, the value M cannot exceed 5.4.

In the present embodiment, the value M obtained by dividing the tire external diameter D by the distance L between the bead heels is in a range of from 4.1 to 5.4. The tire external diameter D is a value measured on the horizontally disposed tire 11 in a free state in which the tire 11 is not attached to the rim. The distance L between the bead heels is a value measured on the vertically disposed tire 11 in the free state, at a position 90 degrees apart in the circumferential direction from the middle of the ground contact area in the circumferential direction. In each of the main belt layers 20, non-stretchable main belt cords extending in the circumferential direction are embedded. To compose the main belt layer 20, for example, ribbon-shaped body that is molded by coating the periphery of the aligned plurality of main belt cords with an unvulcanized rubber may be helically wound. As the main belt cord, a straight extending non-stretchable aromatic polyamide fiber is used here. In the present disclosure, a steel cord bent in a wave (zigzag) shape may be used.

To compose the secondary belt layer 21, a ribbon-shaped body that is molded by coating the periphery of aligned plurality of secondary belt cords with an unvulcanized rubber is wound in a zigzag manner in the circumferential direction, while being folded at both ends of the secondary belt layer 21 in the width direction so as to have reversed inclination directions with respect to the tire equator S, and such winding is repeated a predetermined number of times while shifting the ribbon-shaped body in the circumferential direction. The two secondary belt layers 21, in the upper and lower layers of which the ribbon-shaped bodies are inclined in the reversed directions, are thereby molded at a time. Note that, such winding may be performed repeatedly to mold the secondary belt layers the number of which is an integer multiple of 2. In the present disclosure, when the winding position of the ribbon-shaped body arrives at the both ends of the secondary belt layer in the width direction, the ribbon-shaped body of a certain length may be wound in the circumferential direction and thereafter the winding direction of the ribbon-shaped body may be reversed.

A general tire, for example, a radial tire for truck or bus, which is composed of a lamination of a plurality of inclined belt layers in which belt cords inclined in reversed directions with respect to the tire equator S are embedded, has a large out-of-plane flexural rigidity, so a tire ground contact width does not much increase even during traveling with a load. However, in a case where, as described above, the belt layer 19 is formed of the at least three main belt layers 20 in which the non-stretchable main belt cords extending in the circumferential direction are embedded, and the secondary belt layers 21 that are disposed outer side the main belt layers 20 in a radial direction, and are each formed by winding the ribbon-shaped body, in which the secondary belt cords are embedded, in a zigzag manner while being folded at both the ends in the width direction, and the number of which is lower than the number of the main belt layers 20, since the cords extend in the circumferential direction in the main belt layers 20, which occupies a large proportion of the belt layer 19, the belt layer 19 has a decreased value of the out-of-plane flexural rigidity and therefore is easily deformed. As a result of this, since the tire ground contact width easily increases during traveling with a load, it is possible to further effectively suppress wear at the middle portion of the tread.

In the present embodiment, the belt layer 19 includes four of the main belt layers 20, as described above, and the width K of a fourth main belt layer 20b disposed outermost in the radial direction is in a range from 0.1 to 0.3 times the width Q of a first main belt layer 20a disposed innermost in the radial direction. If the width K is less than 0.1 times the width Q, the diameter grows largely at the middle portion of the tread during traveling with a load, and the crown radius decreases. As a result of this, the uneven wear resistance at the middle portion of the tread deteriorates, and furthermore uneven wear resistance in the entire tread 24 sometimes deteriorates. On the other hand, the width K exceeds 0.3 times the width Q, the growth in the diameter is suppressed at the end portions of the tread, and the crown radius hardly changes. As a result of this, wear resistance may deteriorate in the entire tread 24. Setting the width K in the range from 0.1 to 0.3 times the width Q, as described in the present embodiment, allows easy improvement of the uneven wear resistance at the middle portion of the tread and the wear resistance in the entire tread 24.

Provided that C represents the radius of curvature of an internal surface edge 11a of a cutting plane of the tire 11, which is cut along the meridian, in the tire equator S (in other words, the radius of curvature of the internal surface edge 11a in the tire equator S), and J represents the radius of curvature of the internal surface edge 11a between an intersection A and a point H, a value G obtained by dividing the radius of curvature J by the radius of curvature C is preferably in a range between from 0.152 to 0.166. The intersection A is an intersection between the internal surface edge 11a in the tire meridional cross section and the normal N that is normal to the carcass layer 18 and passes through the ground contact end E of tread of the tire 11. When B represents a length between the tire equator S and the intersection A in the internal surface edge 11a along the carcass layer 18, the point H is distanced 0.84 times the length B apart from the tire equator S. If the value G of J/C is less than 0.152, since the carcass line shifts outward in a radial direction at the end portions of the tread, a ground contact pressure increases, and as is apparent from the following test results, the uneven wear resistance at the middle portion of the tread and the wear resistance in the entire tread 24 may deteriorate. On the other hand, if the value G of J/C exceeds 0.166, since the carcass line shifts inward in the radial direction at the end portions of the tread, the amount of rubber increases at the end portions of the tread, and an increase in the weight of the tire may become a problem.

However, setting the value G of J/C in the range from 0.152 to 0.166 allows improvement of the uneven wear resistance at the middle portion of the tread and easy improvement of the wear resistance in the entire tread surface 25 of the tread 24, while suppressing an increase in the weight of the tire. The radius of curvature of the internal surface edge 11a between the point J and the intersection A sometimes takes a different value, depending on difference in position in the width direction. In such a case, the radius of curvature at a midpoint between the point H and the intersection A is used. The values of the above length B and the radii of curvature C and J can be obtained by measurement of the tire 11 in a free state, i.e. a state of not being attached to the rim. In a case where R represents the rib width of the above middle rib 29, the rib width T of the inner side rib 28 is preferably in a range from 1.2 to 1.8 times the rib width R of the middle rib 29, and the rib width U of the outer side rib 30 is preferably in a range of from 0.8 to 1.4 times the rib width R of the middle rib 29. This is because by setting the rib widths in the above ranges, ground contact pressure distribution is almost made uniform in the ribs, thus resulting in improvement of the wear resistance and durability of the ribs. Furthermore, in the above tire 11, the radius of curvature of the belt layer 19 in the tire meridional cross section is preferably larger than the radius of curvature of the tread surface 25 of the tread 24 in the tire meridional cross section. This makes it possible to easily improve the uneven wear resistance at the end portions of the tread, while suppressing deterioration of the durability owing to an increase in the amount of rubber. At this time, it is further preferable that a value obtained by dividing the radius of curvature of the belt layer 19 by the radius of curvature of the tread surface 25 is in a range of from 1.2 to 1.8.

Practical Example 1

Next, a first test example will be described. In the test, a comparative tire 1, a comparative tire 2, a practical tire 1, a practical tire 2, a practical tire 3, a comparative tire 3, and a comparative tire 4 were prepared.

In the comparative tire 1, the above-described value M obtained by dividing the tire external diameter D by the distance L between the bead heels was 3.2.

In the comparative tire 2, the value M was 4.0.
In the practical tire 1, the value M was 4.1.
In the practical tire 2, the value M was 4.7.
In the practical tire 3, the value M was 5.4.
In the practical tire 3, the value M was 5.4.
In the comparative tire 3, the value M was 5.5.
In the comparative tire 4, the value M was 5.8.

Each tire has the same internal structure as Embodiment 1. The value G obtained by dividing the radius of curvature J by the radius of curvature C was 0.148. The rib width T of the inner side rib was 1.5 times the rib width R of the middle rib. The rib width U of the outer side rib was 1.1 times the rib width R of the middle rib. Furthermore, the width K of the fourth main belt layer was 0.2 times the width Q of the first main belt layer. The size of each of the above tires was H38×13.0R18 22PR.

Next, each of the tires was attached to a standard normal rim (H38×13.0R18), and a standard normal internal pressure was charged into the tire. The tire was traveled with being pressed against a drum with an application of a standard normal load. After the travel, the amount of wear was measured at the middle portion and the end portion of the tread. A value obtained by dividing the amount of wear at the end portion of the tread of the comparative tire 1 by the amount of wear at the middle portion of the tread thereof was used as an index of 100, and such values were calculated on the other tires. Table 1 shows the results. In Table 1, the higher the value, the better the uneven wear resistance.

TABLE 1

| | Comparative tire | | Practical tire | | | Comparative tire | |
|---|---|---|---|---|---|---|---|
| | 1 | 2 | 1 | 2 | 3 | 3 | 4 |
| M | 3.2 | 4.0 | 4.1 | 4.7 | 5.4 | 5.5 | 5.8 |
| Uneven wear resistance | 100 | 100 | 103 | 103 | 104 | 104 | 105 |

Next, a second test example will be described. In the test, a comparative tire 5, a comparative tire 6, a practical tire 4, a practical tire 5, a practical tire 6, a comparative tire 7, and a comparative tire 8 were prepared.

In the comparative tire 5, the value G obtained by dividing the radius of curvature J by the radius of curvature C was 0.145.

In the comparative tire 6, the value G was 0.150.
In the practical tire 4, the value G was 0.152.
In the practical tire 5, the value G was 0.160.
In the practical tire 6, the value G was 0.166.
In the comparative tire 7, the value G was 0.170.
In the comparative tire 8, the value G was 0.175.

Each tire has the same internal structure as Embodiment 1. The value M obtained by dividing the tire external diameter D by the distance L between the bead heels was 4.7. The rib width T of the inner side rib was 1.5 times the rib width R of the middle rib. The rib width U of the outer side rib was 1.1 times the rib width R of the middle rib. Furthermore, the width K of the fourth main belt layer was 0.2 times the width Q of the first main belt layer. The size of each of the above tires was H38×13.0R18 22PR.

Next, each of the tires was attached to a standard normal rim (H38×13.0R18), and a standard normal internal pressure was charged into the tire. The tire was traveled with being pressed against a drum with an application of a standard normal load. After the travel, the amount of wear was measured at the middle portion and the end portion of the tread. A value obtained by dividing the amount of wear at the end portion of the tread of the comparative tire 5 by the amount of wear at the middle portion of the tread thereof was used as an index of 100, and such values were calculated on the other tires. Table 2 shows the results. In Table 2, the higher the value, the better the uneven wear resistance.

TABLE 2

| | Comparative tire | | Practical tire | | | Comparative tire | |
|---|---|---|---|---|---|---|---|
| | 5 | 6 | 4 | 5 | 6 | 7 | 8 |
| G | 0.145 | 0.150 | 0.152 | 0.160 | 0.166 | 0.170 | 0.175 |
| Uneven wear resistance | 100 | 100 | 103 | 103 | 104 | 104 | 105 |

All the documents, patent applications, and technical standards cited in this application are hereby incorporated by reference into the present application, to the same extent as if each of the documents, patent applications, and technical standards were concretely and individually indicated to be incorporated by reference.

INDUSTRIAL APPLICABILITY

The present disclosure is applicable to an industrial field of radial tires for the aircraft having a rim diameter of 20 inches or less.

The invention claimed is:

1. A radial tire for an aircraft, the radial tire having a rim diameter of 20 inches or less, the radial tire comprising:
   a pair of bead portions;
   a pair of sidewall portions extending outward from the bead portions in a substantially radial direction;
   a tread portion that couples together respective radial outer ends of the sidewall portions;
   a toroidal carcass layer reinforcing a portion between bead cores embedded in the bead portions; and
   a belt layer and a tread that are sequentially laminated on an outer side of the carcass layer in the radial direction,
   wherein a value M obtained by dividing a tire external diameter D by a distance L between bead heels of the bead portions is in a range of from 4.1 to 5.4;
   wherein in a case in which A represents an intersection between an internal surface edge in a tire meridional cross section and a normal N that is normal relative to the carcass layer and passes through a tread ground contact end E, B represents a length between a tire equator S and the intersection A along the carcass layer, C represents a radius of curvature of the internal surface edge at the tire equator S, and J represents a radius of curvature of the internal surface edge between the intersection A and a point H that is distanced 0.84 times the length B apart from the tire equator S, a value G obtained by dividing the radius of curvature J by the radius of curvature C is in a range of from 0.152 to 0.166.

2. The radial tire for an aircraft according to claim 1, wherein the belt layer comprises at least three main belt layers, in which non-stretchable main belt cords extending in a circumferential direction are embedded, and a lower number of secondary belt layers than a number of the main belt layers, and wherein each of the secondary belt layers comprises a ribbon-shaped body and secondary belt cords embedded in the ribbon-shaped body, the ribbon-shaped body being wound in a zigzag manner and folded over at both ends in the width direction.

3. The radial tire for an aircraft according to claim 1, wherein a pair of inner side main grooves, extending in a circumferential direction, is formed in a tread surface of the tread on respective sides of a tire equator S, and a pair of outer side main grooves is formed in the tread surface respective outer sides of the inner side main grooves in a width direction, such that one inner side rib extending in the circumferential direction is formed between the inner side main grooves, and a pair of middle ribs extending in the circumferential direction are respectively formed between the inner side main grooves and the outer side main grooves, and a pair of outer side ribs is respectively formed between the outer side main grooves and a ground contact ends of the tread, wherein a rib width T of the inner side rib is in a range of from 1.2 to 1.8 times a rib width R of each of the middle ribs, and a rib width U of each of the outer side ribs is in a range of from 0.8 to 1.4 times the rib width R of the middle ribs.

4. The radial tire for an aircraft according claim 1, wherein a radius of curvature of the belt layer in a tire meridional cross section is larger than a radius of curvature of a tread surface of the tread in the tire meridional cross section.

5. The radial tire for an aircraft according to claim 1, wherein the belt layer comprises at least three main belt layers, in which non-stretchable main belt cords extending in a circumferential direction are embedded, and a lower number of secondary belt layers than a number of the main belt layers, and wherein each of the secondary belt layers comprises a ribbon-shaped body and secondary belt cords embedded in the ribbon-shaped body, the ribbon-shaped body being wound in a zigzag manner and folded over at both ends in the width direction, and the belt layer comprises four of the main belt layers, and a width K of a fourth main belt layer disposed outermost in the radial direction is in a range of from 0.1 to 0.3 times a width Q of a first main belt layer disposed innermost in the radial direction.

6. The radial tire for an aircraft according to claim 1, wherein the belt layer comprises at least three main belt layers, in which non-stretchable main belt cords extending in a circumferential direction are embedded, and a lower number of secondary belt layers than a number of the main belt layers, and wherein each of the secondary belt layers comprises a ribbon-shaped body and secondary belt cords embedded in the ribbon-shaped body, the ribbon-shaped body being wound in a zigzag manner and folded over at both ends in the width direction, and a pair of inner side main grooves, extending in a circumferential direction, is formed in a tread surface of the tread on respective sides of a tire equator S, and a pair of outer side main grooves is formed in the tread surface respective outer sides of the inner side main grooves in a width direction, such that one inner side rib extending in the circumferential direction is formed between the inner side main grooves, and a pair of middle ribs extending in the circumferential direction are respectively formed between the inner side main grooves and the outer side main grooves, and a pair of outer side ribs is respectively formed between the outer side main grooves and a ground contact ends of the tread, wherein a rib width T of the inner side rib is in a range of from 1.2 to 1.8 times a rib width R of each of the middle ribs, and a rib width U of each of the outer side ribs is in a range of from 0.8 to 1.4 times the rib width R of the middle ribs.

7. The radial tire for an aircraft according to claim 1, wherein the belt layer comprises at least three main belt layers, in which non-stretchable main belt cords extending in a circumferential direction are embedded, and a lower number of secondary belt layers than a number of the main belt layers, and wherein each of the secondary belt layers comprises a ribbon-shaped body and secondary belt cords embedded in the ribbon-shaped body, the ribbon-shaped body being wound in a zigzag manner and folded over at both ends in the width direction, and a radius of curvature of the belt layer in a tire meridional cross section is larger than a radius of curvature of a tread surface of the tread in the tire meridional cross section.

8. The radial tire for an aircraft according to claim 1, wherein a pair of inner side main grooves, extending in a circumferential direction, is formed in a tread surface of the tread on respective sides of a tire equator S, and a pair of outer side main grooves is formed in the tread surface respective outer sides of the inner side main grooves in a width direction, such that one inner side rib extending in the circumferential direction is formed between the inner side main grooves, and a pair of middle ribs extending in the circumferential direction are respectively formed between the inner side main grooves and the outer side main grooves, and a pair of outer side ribs is respectively formed between the outer side main grooves and a ground contact ends of the tread, wherein a rib width T of the inner side rib is in a range of from 1.2 to 1.8 times a rib width R of each of the middle ribs, and a rib width U of each of the outer side ribs is in a range of from 0.8 to 1.4 times the rib width R of the middle ribs, and a radius of curvature of the belt layer in a tire meridional cross section is larger than a radius of curvature of a tread surface of the tread in the tire meridional cross section.

9. The radial tire for an aircraft according to claim 1, wherein the belt layer comprises at least three main belt layers, in which non-stretchable main belt cords extending in a circumferential direction are embedded, and a lower number of secondary belt layers than a number of the main belt layers, and wherein each of the secondary belt layers comprises a ribbon-shaped body and secondary belt cords embedded in the ribbon-shaped body, the ribbon-shaped body being wound in a zigzag manner and folded over at both ends in the width direction, a pair of inner side main grooves, extending in a circumferential direction, is formed in a tread surface of the tread on respective sides of a tire equator S, and a pair of outer side main grooves is formed in the tread surface respective outer sides of the inner side main grooves in a width direction, such that one inner side rib extending in the circumferential direction is formed between the inner side main grooves, and a pair of middle ribs extending in the circumferential direction are respectively formed between the inner side main grooves and the outer side main grooves, and a pair of outer side ribs is respectively formed between the outer side main grooves and a ground contact ends of the tread, wherein a rib width T of the inner side rib is in a range of from 1.2 to 1.8 times a rib width R of each of the middle ribs, and a rib width U of each of the outer side ribs is in a range of from 0.8 to 1.4 times the rib width R of the middle ribs, and a radius of curvature of the belt layer in a tire meridional cross section is larger than a radius of curvature of a tread surface of the tread in the tire meridional cross section.

10. A radial tire for an aircraft, the radial tire having a rim diameter of 20 inches or less, the radial tire comprising:
a pair of bead portions;
a pair of sidewall portions extending outward from the bead portions in a substantially radial direction;
a tread portion that couples together respective radial outer ends of the sidewall portions;
a toroidal carcass layer reinforcing a portion between bead cores embedded in the bead portions; and
a belt layer and a tread that are sequentially laminated on an outer side of the carcass layer in the radial direction,
wherein a value M obtained by dividing a tire external diameter D by a distance L between bead heels of the bead portions is in a range of from 4.1 to 5.4;
wherein the belt layer comprises at least three main belt layers, in which non-stretchable main belt cords extending in a circumferential direction are embedded, and a lower number of secondary belt layers than a number of the main belt layers, and wherein each of the secondary belt layers comprises a ribbon-shaped body and secondary belt cords embedded in the ribbon-shaped body, the ribbon-shaped body being wound in a zigzag manner and folded over at both ends in the width direction, and
wherein the belt layer comprises four of the main belt layers, and a width K of a fourth main belt layer disposed outermost in the radial direction is in a range of from 0.1 to 0.3 times a width Q of a first main belt layer disposed innermost in the radial direction.

* * * * *